US011917451B2

United States Patent
Kim et al.

(10) Patent No.: US 11,917,451 B2
(45) Date of Patent: Feb. 27, 2024

(54) METHOD BY WHICH NWDAF TRANSMITS AND RECEIVES SIGNAL IN WIRELESS COMMUNICATION SYSTEM, AND DEVICE THEREFOR

(71) Applicant: LG ELECTRONICS INC., Seoul (KR)

(72) Inventors: Laeyoung Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 375 days.

(21) Appl. No.: 17/310,509

(22) PCT Filed: Feb. 7, 2020

(86) PCT No.: PCT/KR2020/001787
§ 371 (c)(1),
(2) Date: Aug. 6, 2021

(87) PCT Pub. No.: WO2020/162720
PCT Pub. Date: Aug. 13, 2020

(65) Prior Publication Data
US 2022/0038946 A1    Feb. 3, 2022

(30) Foreign Application Priority Data

Feb. 8, 2019    (KR) .......................... 10-2019-0015169

(51) Int. Cl.
*H04W 28/02*    (2009.01)
*H04W 4/40*    (2018.01)
*H04W 28/24*    (2009.01)

(52) U.S. Cl.
CPC ... *H04W 28/0289* (2013.01); *H04W 28/0284* (2013.01); *H04W 28/24* (2013.01); *H04W 4/40* (2018.02)

(58) Field of Classification Search
CPC ......... H04W 28/0289; H04W 28/0284; H04W 28/24; H04W 4/40
See application file for complete search history.

(56) References Cited

U.S. PATENT DOCUMENTS

2018/0220327 A1   8/2018   Karampatsis et al.
2020/0100137 A1*   3/2020   Panchal ................ H04W 48/18
(Continued)

OTHER PUBLICATIONS

PCT International Application No. PCT/KR2020/001787, International Search Report dated Jun. 3, 2020, 15 pages.

(Continued)

*Primary Examiner* — Christopher M Crutchfield
*Assistant Examiner* — Tito Q Pham
(74) *Attorney, Agent, or Firm* — LEE, HONG, DEGERMAN, KANG & WAIMEY

(57) ABSTRACT

One embodiment provides a method by which a network data analytics function (NWDAF) transmits and receives a signal in a wireless communication system, comprising the steps in which an NWDAF receives, from operations and maintenance (OAM), a notification based on a change in a user plane congestion status and transmits, to a V2X application server, analytics for the user plane congestion notification on the basis of the notification through a network exposure function (NEF), wherein the change in the user plane congestion status is determined on the basis of one or more pieces of information including whether a QNC notification is transmitted, and whether the QNC notification is transmitted is determined on the basis of a counter value that increases when an NG-RAN transmits, to an SMF, "GFBR cannot be fulfilled/guaranteed," and decreases when the NG-RAN transmits, to the SMF, "GFBR cannot be fulfilled/guaranteed."

13 Claims, 22 Drawing Sheets

(56) References Cited

U.S. PATENT DOCUMENTS

| | | | |
|---|---|---|---|
| 2020/0112907 A1* | 4/2020 | Dao | H04M 15/8016 |
| 2021/0250814 A1* | 8/2021 | Poe | H04L 41/12 |
| 2021/0352521 A1* | 11/2021 | Pan | H04L 47/24 |
| 2021/0377810 A1* | 12/2021 | Condoluci | H04W 28/12 |

OTHER PUBLICATIONS

Nokia et al., "NWDAF procedures for user plane congestion analytics," S2-1900656, 3GPP TSG-SA WG2 Meeting #130, Jan. 2019, 7 pages.

Huawei et al., "Consistent usage of Policy Control Request Trigger GFBR of QoS Flow cannot be guaranteed," S2-1810523, 3GPP TSG-SA WG2 Meeting #129, Oct. 2018, 16 pages.

Qualcomm Incorporated, "QoS Notification Control during handover," S2-1900172, 3GPP TSG-SA WG2 Meeting #130, Jan. 2019, 4 pages.

3rd Generation Partnership Project, "Technical Specification Group Services and System Aspects; Policy and Charging Control Framework for the 5G System; Stage 2 (Release 15)," 3GPP TS 23.503 V15.4.0, Dec. 2018, 78 pages.

\* cited by examiner

FIG. 9
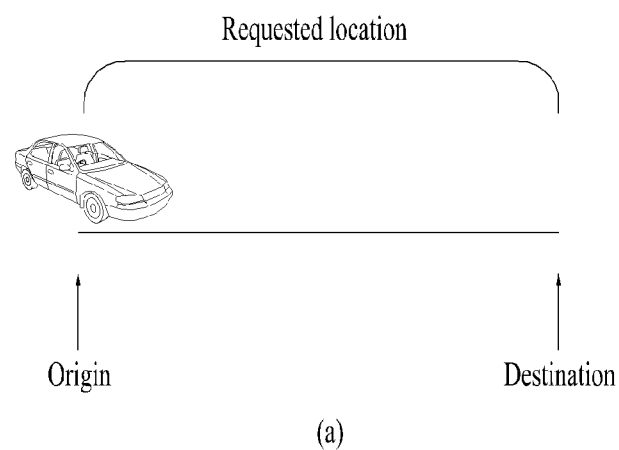
(a)
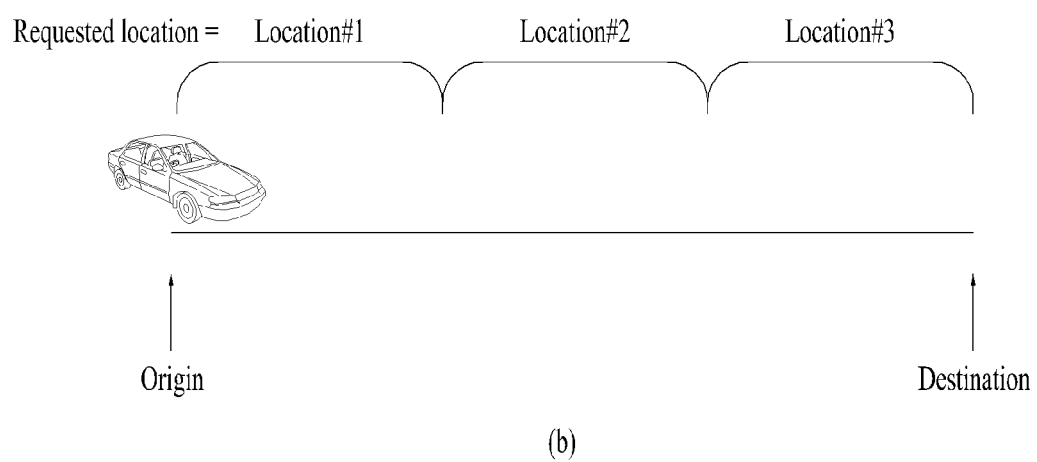
(b)

METHOD BY WHICH NWDAF TRANSMITS AND RECEIVES SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/001787, filed on Feb. 7, 2020, which claims the benefit of earlier filing date and right of priority to Korean Patent Application No. 10-2019-0015169, filed on Feb. 8, 2019, the contents of which are all incorporated by reference herein in their entirety.

TECHNICAL FIELD

The present disclosure relates to a wireless communication system, and more particularly to a method and device for allowing a network data analytics function (NWDAF) to be relevant to reception of a notification message based on a change of a user plane congestion status from operations and maintenance (OAM).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Wireless communication systems adopt various radio access technologies (RATs) such as long term evolution (LTE), LTE-advanced (LTE-A), and wireless fidelity (WiFi). 5th generation (5G) is one of them. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, and media and entertainment applications in the cloud or augmented reality (AR). Data is one of the key drivers for 5G and in the 5G era, we may see no dedicated voice service for the first time. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in greater detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

DISCLOSURE

Technical Problem

An object of the present disclosure is to provide a method for enabling a network data analytics function (NWDAF) to be relevant to reception of a notification message based on a change of a user plane congestion status from the operations and maintenance (OAM).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with an aspect of the present disclosure, a method for enabling a network data analytics function (NWDAF) to transmit and receive signals in a wireless communication system may include receiving, by the NWDAF, a notification message based on a change of a user plane congestion status from operations and maintenance (OAM), and transmitting, by the NWDAF, a user plane congestion analytics notification based on the notification message to a V2X application server through a network exposure function (NEF). The change of the user plane congestion status may be determined based on at least one information including specific information indicating whether a QoS Notification Control (QNC) notification has been transmitted. The specific information indicating whether the QNC notification has been transmitted may be determined based on a counter value that increases when an NG-RAN transmits 'GFBR cannot be fulfilled/guaranteed' to a session management function (SMF) and decreases when the NG-RAN transmits 'GFBR cannot be fulfilled/guaranteed' to the SMF.

In accordance with another aspect of the present disclosure, a device for use in a wireless communication system may include at least one processor, and at least one computer memory operatively connected to the at least one processor, and configured to store instructions such that the at least one processor performs specific operations by executing the instructions. The specific operations may include receiving, by the NWDAF, a notification message based on a change of a user plane congestion status from operations and maintenance (OAM), and transmitting, by the NWDAF, a user plane congestion analytics notification based on the notification message to a V2X application server through a network exposure function (NEF). The change of the user plane congestion status may be determined based on at least one information including specific information indicating whether a QoS Notification Control (QNC) notification has been transmitted. The specific information indicating whether the QNC notification has been transmitted may be determined based on a counter value that increases when an NG-RAN transmits 'GFBR cannot be fulfilled/guaranteed' to a session management function (SMF) and decreases when the NG-RAN transmits 'GFBR cannot be fulfilled/guaranteed' to the SMF.

The notification of the user plane congestion analytics may include information about a location and time where a QoS (quality of service) potential change occurs.

The method may further include receiving, by the NWDAF, a second subscribe request from the NEF that has received a first subscribe request related to congestion related analytics information from the V2X application server, transmitting, by the NWDAF, a third subscribe request to the OAM while providing a threshold value in response to the first subscribe request, receiving, by the NWDAF, a response to the third subscribe request from the OAM, and transmitting, by the NWDAF, the user plane congestion analytics calculated based on the response to the V2X application server through the NEF.

The first subscribe request may include a subscription request for a plurality of locations.

The subscription request for the plurality of locations may include an observation start time and an observation end time for each of the locations.

Each of the plurality of locations may be a geographical region designated/described by the V2X application server.

The geographical region may be any one selected from among cell ID(s), TAI(s), a polygon, a circle, and an address.

The first subscribe request may include a subscription request for a location.

If the location is a portion of a path, the V2X application server may perform subscription for a next location subsequent to the location on the path, and then cancels subscription of the location.

The threshold value may be included in the at least one information.

The threshold value may be at least one of 5QI(s), GFBR—UL & DL, and MFBR—UL & DL.

The NEF may convert a location where there is a possibility that the QoS potential change occurs, into any one of a polygon, a circle, and an address.

Advantageous Effects

The embodiments of the present disclosure can properly determine a congestion level, rather than determining the congestion level based on how many times the conventional GBR bearer was removed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure. In the drawings:

FIGS. 8 to 12 are diagrams illustrating the embodiment(s) of the present disclosure.

BEST MODE

Figure 1:
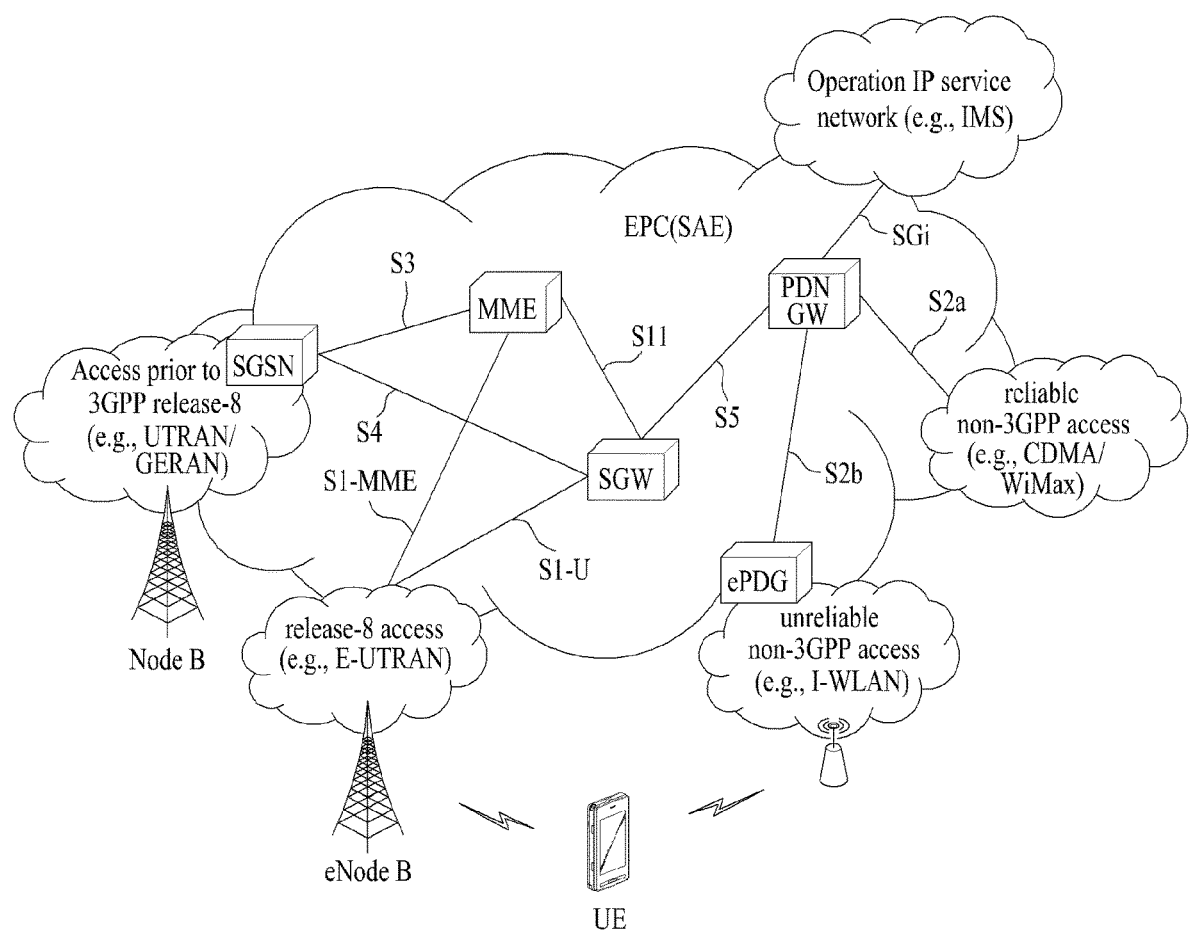
FIG. 1 is a schematic diagram illustrating the structure of an evolved packet system (EPS) including an evolved packet core (EPC).

The embodiments below are combinations of components and features of the present disclosure in a prescribed form. Each component or feature may be considered as selective unless explicitly mentioned as otherwise. Each component or feature may be executed in a form that is not combined with other components and features. Further, some components and/or features may be combined to configure an embodiment of the present disclosure. The order of operations described in the embodiments of the present disclosure may be changed. Some components or features of an embodiment may be included in another embodiment or may be substituted with a corresponding component or feature of the present disclosure.

Specific terms used in the description below are provided to help an understanding of the present disclosure, and the use of such specific terms may be changed to another form within the scope of the technical concept of the present disclosure.

In some cases, in order to avoid obscurity of the concept of the present disclosure, a known structure and apparatus may be omitted, or a block diagram centering on core functions of each structure or apparatus may be used. Moreover, the same reference numerals are used for the same components throughout the present specification.

The embodiments of the present disclosure may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present disclosure in the embodiments of the present disclosure may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present disclosure is non-limited.

Terms used in the present document are defined as follows.

UNITS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UNITS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UNITS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UNITS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data is exchanged through a direct data path without passing through a 3GPP core network (e.g., EPC).

EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UNITS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also based on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2*a* and S2*b* correspond to non-3GPP interfaces. S2*a* is a reference point which provides reliable non-3GPP access and related control and mobility support between PDN GWs to a user plane. S2*b* is a reference point which provides related control and mobility support between the ePDG and the PDN GW to the user plane.

Figure 2:
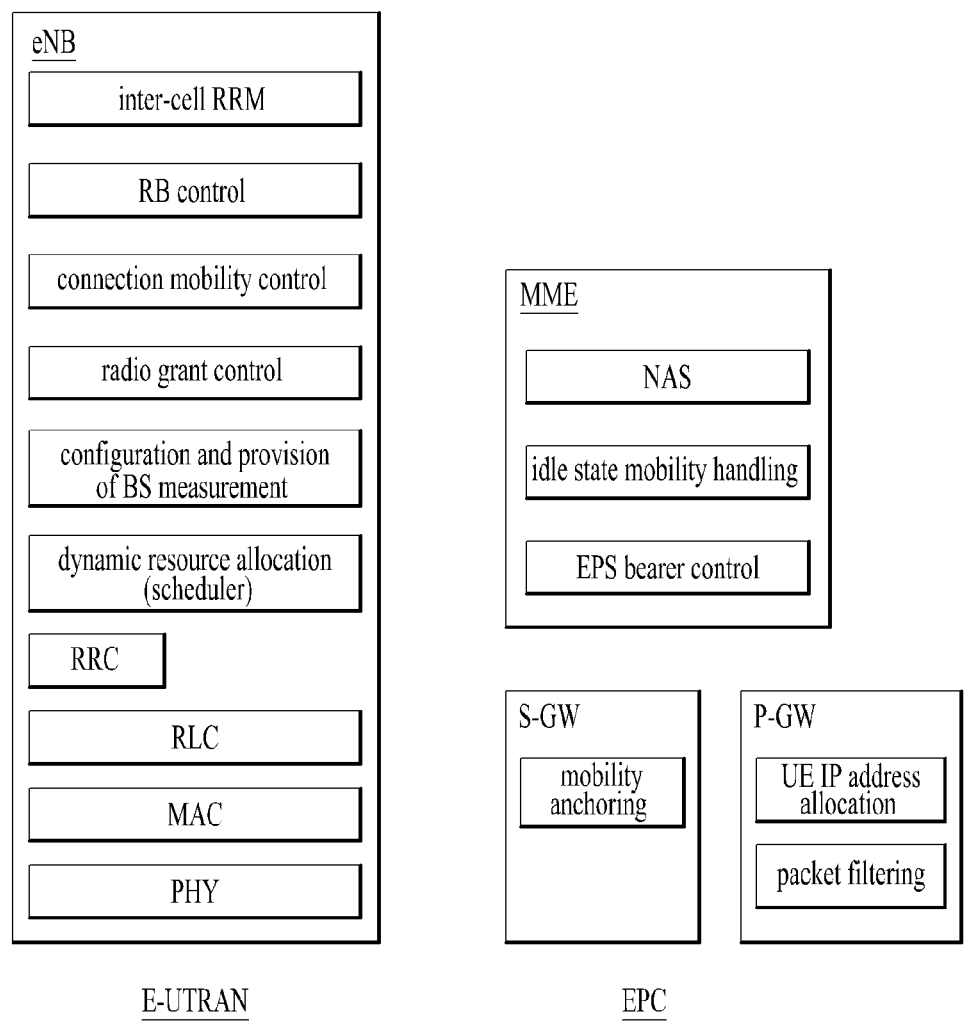
FIG. 2 is a diagram illustrating the general architectures of an E-UTRAN and an EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
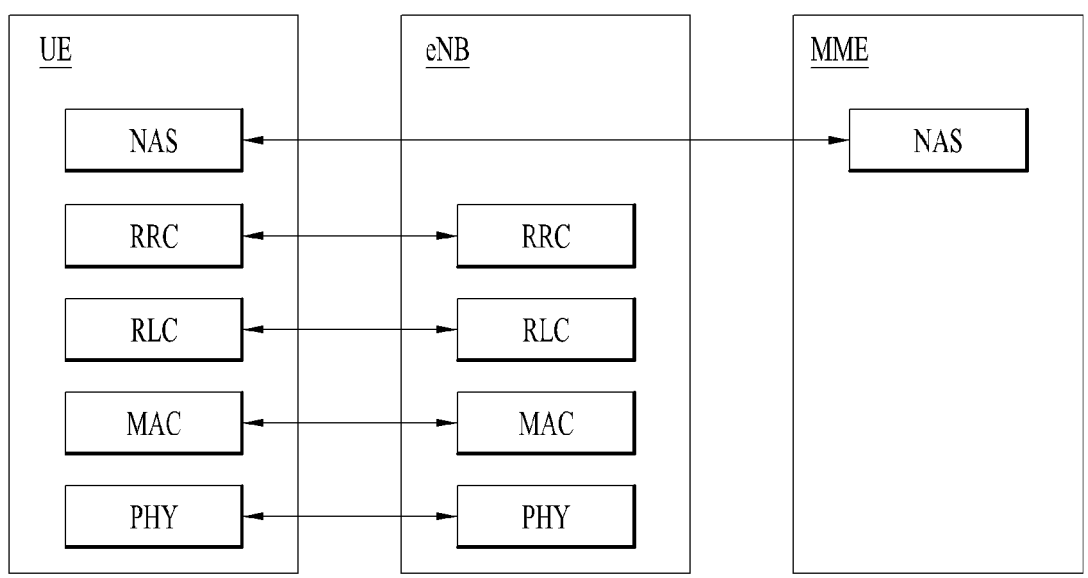
FIG. 3 is a diagram illustrating the structure of a radio interface protocol in a control plane.
Figure 4:
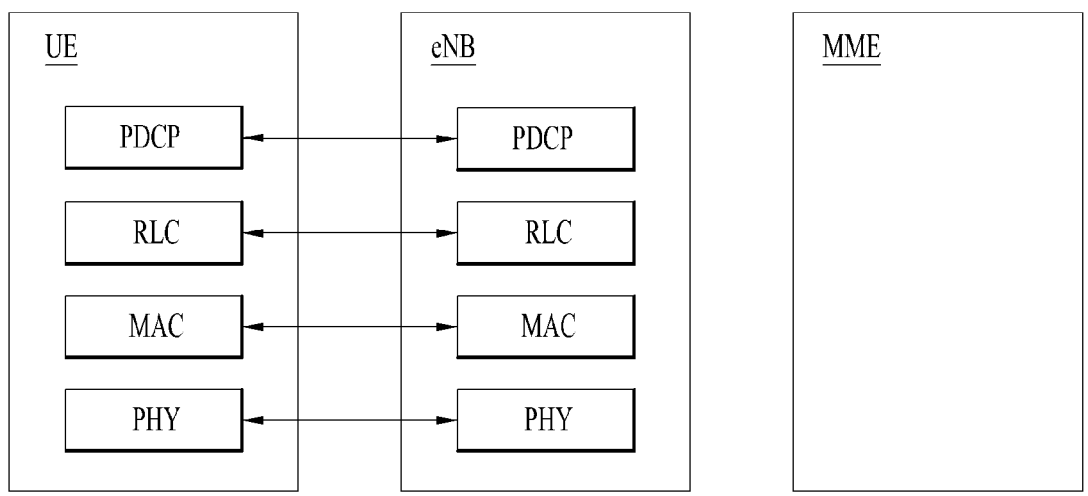
FIG. 4 is a diagram illustrating the structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one identifier (ID). This ID is called an EPS bearer ID. One EPS bearer has QoS characteristics of a maximum bit rate (MBR) and/or a guaranteed bit rate (GBR).

Figure 5:
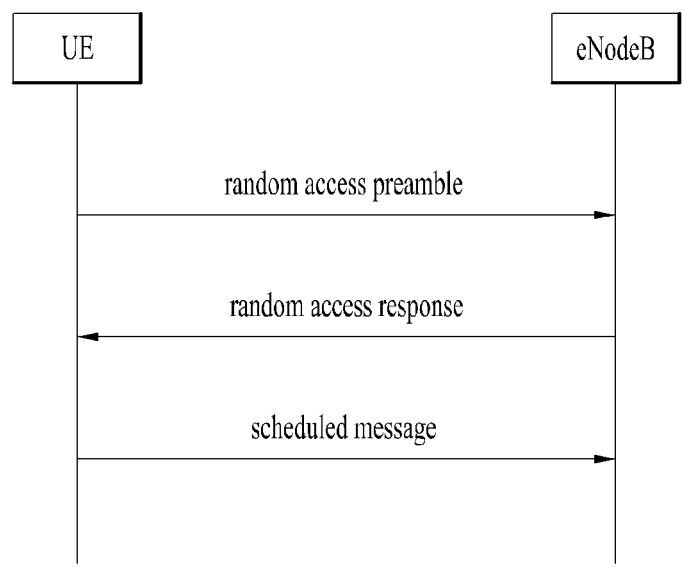
FIG. 5 is a flowchart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
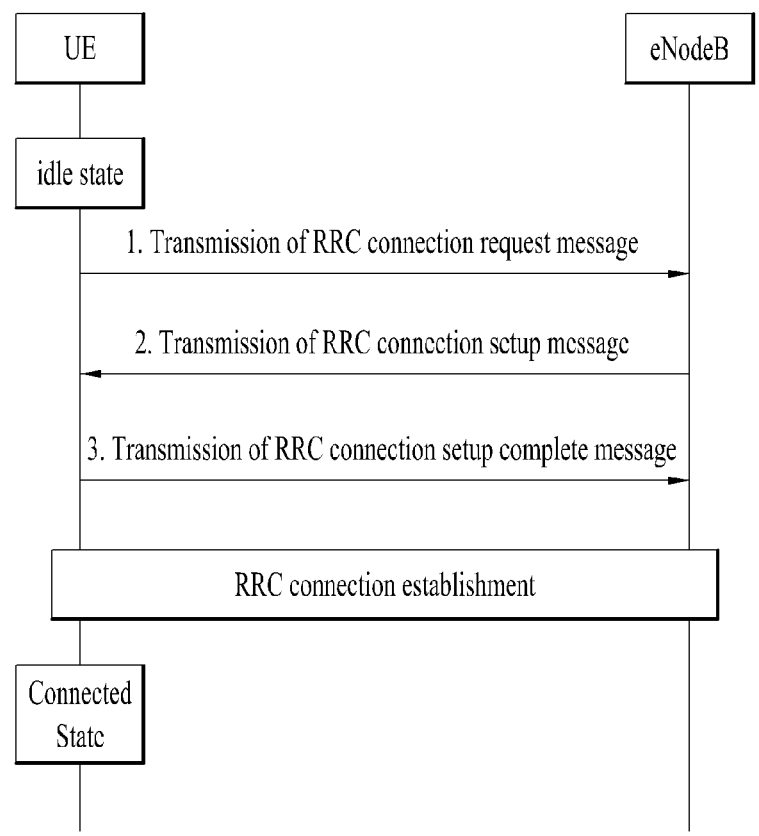
FIG. 6 is a diagram illustrating a connection process in a radio resource control (RRC) layer.

FIG. 6 illustrates a connection procedure in a radio resource control (RRC) layer.

As shown in FIG. 6, the RRC state is configured according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

Figure 7:
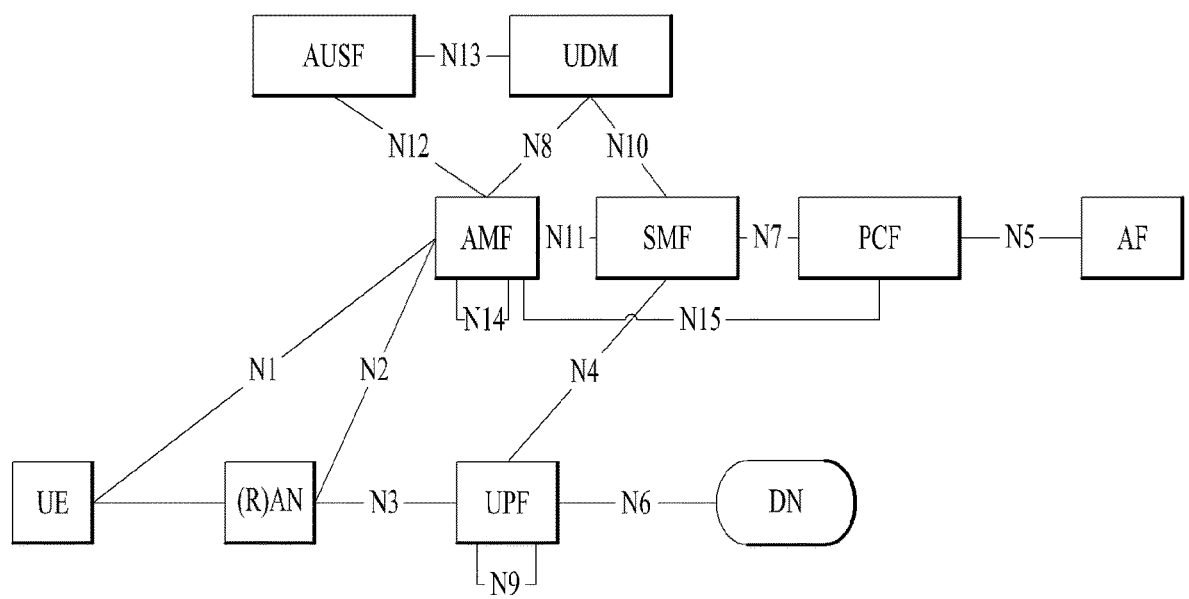
FIG. 7 is a diagram illustrating a 5th generation (5G) system.

The functionality of the MME in the legacy EPC is decomposed into the access and mobility management function (AMF) and the session management function (SMF) in the next generation system (or 5G core network (CN)). The AMF carries out NAS interaction with a UE and mobility management (MM), whereas the SMF carries out session management (SM). The SMF also manages a gateway, user plane function (UPF), which has the user-plane functionality, that is, routes user traffic. It may be considered that the SMF and the UPF implement the control-plane part and user-plane part of the S-GW and the P-GW of the legacy EPC, respectively. To route user traffic, one or more UPFs may exist between a RAN and a data network (DN). That is, for 5G implementation, the legacy EPC may have the configuration illustrated in FIG. 7. In the 5G system, a protocol data unit (PDU) session has been defined as a counterpart to a PDN connection of the legacy EPS. A PDU session refers to association between a UE and a DN, which provides a PDU connectivity service of an Ethernet type or an unstructured type as well as an IP type. The unified data management (UDM) performs the same functionality as the HSS of the EPC, and the policy control function (PCF) performs the same functionality as the policy and charging rules function (PCRF) of the EPC. Obviously, the functionalities may be extended to satisfy the requirements of the 5G system. For details of the architecture, functions, and interfaces of a 5G system, TS 23.501 is conformed to.

The 5G system is being worked on in TS 23.501 and TS 23.502. Accordingly, the technical specifications are conformed to for the 5G system in the present disclosure. Further, TS 38.300 is conformed to for details of NG-RAN-related architecture and contents. As the 5G system also supports non-3GPP access, section 4.2.8 of TS 23.501 describes architecture and network elements for supporting non-3GPP access, and section 4.12 of TS 23.502 describes procedures for supporting non-3GPP access. A representative example of non-3GPP access is WLAN access, which may include both a trusted WLAN and an untrusted WLAN. The AMF of the 5G system performs registration management (RM) and connection management (CM) for non-3GPP access as well as 3GPP access. As such, the same AMF serves a UE for 3GPP access and non-3GPP access belonging to the same PLMN, so that one network function may integrally and efficiently support authentication, mobility management, and session management for UEs registered through two different accesses.

On the other hand, Section #5.25 of TR 23.786v1.1.0 has described the agenda for predicting a potential change (that has difficulty in satisfying the requested QoS) of a quality of service (QoS) that is provided to a certain region (which may be a region where movement of the UE is expected) through a network, notifying the application of the predicted potential change, and assisting the application in taking appropriate actions. For this agenda, as defined in TS 22.186, each eV2X service may be provided with other application configurations, for example, automation levels, vehicle-to-vehicle gaps, etc. Each application configuration may have different QoS requirements. As a result, when QoS is changed according to a new QoS to be delivered, the configuration of the application should be adjusted in response to the changed QoS. In order to dynamically adjust configurations of some application(s) in consideration of the requirements of the eV2X service, pre-notifying the potential change of the delivered QoS by some application(s) may be considered significantly important. In this case, such notification may take into account the location where the UE is likely to operate for a given time. The most important issue is to study 5GS improvement required to support adjustment of the application related to the eV2X service in response to the notification message indicating the potential change of the delivered QoS.

Figure 8:
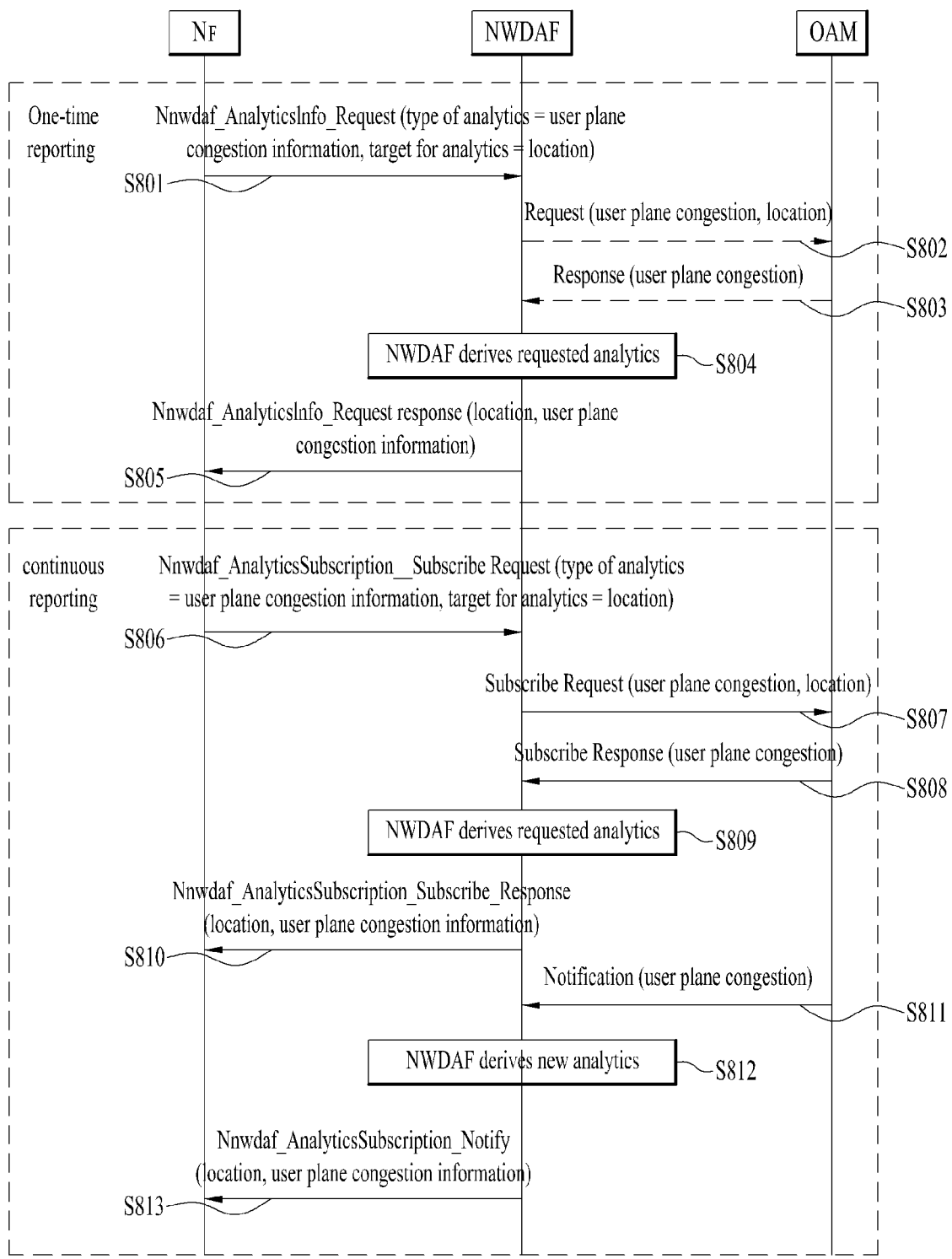

FIG. 8 is a flowchart illustrating a method for retrieving user plane congestion analytics of a specific geographic region by an NF. The method shown in FIG. 8 can be used to request a one-time or continuous report for user plane congestion analytics.

In step S801, NF may transmit 'Nnwdaf_AnalyticsInfo_Request' to the NWDAF, and may thus indicate a request for user plane congestion analytics at a specific location. The NF may request statistics, predictions, or both statistics and predictions as needed. The analytics type may be set to a user plane congestion status, and the object to be analyzed may be set to a location (e.g., ECGI, TA). In steps S802 and S803, in order to provide the requested analytics after the request was approved, NWDAF may request user plane congestion status for the requested location from the OAM. Here, the OAM may provide requested information. If information about the user plane congestion status of the requested location was already present in the NWDAF, the above steps may be omitted.

In step S804, NWDAF may retrieve the requested analytics. In step S805, NWDAF may provide the NF with user plane congestion analytics. In step S806, NF may transmit a request 'Nnwdaf_EventsSubscription_Subscribe' to the NWDAF, and may request the user plane congestion analytics at a specific location (e.g., ECGI or TA). The NS may request statistics, prediction, or both thereof.

In steps S807 and S808, NWDAF provides a congestion level threshold, and at the same time performs OAM subscription to obtain a user plane congestion state of the requested location. Then, the OAM again provides the first report for the requested information in response to the OAM subscription.

In step S809, NWDAF may derive the requested analytics. In step S810, the NWDAF may provide the NF with the analytics of the user plane congestion. In step S811, the change of the user plane congestion status corresponding to exceeding the threshold value decided by the NWDAF may be detected by the OAM, and the NWDAF may be notified thereof. In step S812, NWDAF may derive new analytics. In step S813, NWDAF may provide analytics notification of user plane congestion related to the NF.

Hereinafter, a method for processing QoS change prediction based on the above-described content will be described in detail.

The following method for processing QoS change prediction through the 3GPP 5G system (5G mobile communication system, the next generation mobile communication system) can be implemented as a combination of operations/structures/steps to be described below. Specifically, the method proposed in the embodiment(s) may be useful for the V2X service. However, the above-described method need not be limited to the V2X service. If the above-described method is applied to any other services other than the V2X service, the V2X application service can be replaced with the application function or the application server. In some implementations, the V2X service may be interchangeably used with a V2X application, a V2X message, V2X traffic, V2X data, etc. In association with the V2X service, the UE may include various kinds of UEs, such as a vehicle UE as well as a pedestrian UE. The QoS may be QoS for PC5 communication and/or QoS for Uu communication.

Embodiments

In some implementations, NWDAF may receive a notification message caused by the user plane congestion status from the OAM, and may transmit the user plane congestion analytics to the V2X application server through a network exposure function (NEF) based on the received notification message.

Here, the change of the user plane congestion status may be determined based on at least one piece of information indicating whether QoS Notification Control (QNC) notification has been transmitted. Whether the QNC notification has been transmitted may be determined based on a counter value that increases when NG-RAN transmits 'GFBR cannot be fulfilled/guaranteed' to SMF and decreases when NG-RAN transmits 'GFBR cannot be fulfilled/guaranteed' to SMF. More specifically, QoS requirements (e.g., 5QI(s), GFBR—UL and DL, MFBR—UL and DL) may be provided as a threshold value to be used for user plane congestion notification regarding the potential change of QoS. The change of the user plane congestion status detected by the OAM may be detected based on information as to whether 5QI(s) packet delay, average UL/DL throughput, DRB accessibility/preservation, and QNC notification have been transmitted. For example, after the NG-RAN notifies the SMF of an unavailable state of the GFBR requirements, the change of the user plane congestion status can be detected based on specific information indicating that 're-fulfillment' has not yet been notified. Here, in association with information as to whether notification for QNC (QoS Notification Control) has been sent (e.g., whether NG-RAN has informed SMF that it cannot fulfill the GFBR requirement but re-fulfillment has not been notified yet), the QAM may increase by 1 when NG-RAN transmits 'GFBR cannot be fulfilled/guaranteed' to an SMF (i.e., a core network) in association with the QoS flow of a specific 5QI, and may decrease by 1 when NR-RAN transmits 'GFBR can be fulfilled/guaranteed again' to the SMF in association with the QoS flow, so that information as to whether QNC notification has been transmitted can be measured. In addition, when QNC notification has been transmitted at least N times (not only once), the V2X application server or the NWDAF may request a notification message indicating the presence of the change of the user plane congestion status.

The user plane congestion analytics notification may include information about the location and time where the QoS potential change is likely to occur.

The operation of enabling the NWDAF to receive a notification message based on the change of the user plane congestion status from the OAM may be performed after execution of the next step corresponding to a subscribe request/response procedure between the OAM and the V2X application server. In this case, the subscribe request/response procedure may include receiving, by the NWDAF, a second subscribe request from a network exposure function (NEF) that has received a first subscribe request related to congestion related analytics information from the V2X application server; transmitting, by the NWDAF, a third subscribe request to the OAM while providing a threshold value in response to the first subscribe request; receiving, by the NWDAF, a response to the third subscribe request from the OAM; and transmitting, by the NWDAF, the user plane congestion analytics calculated based on the response to the V2X application server through the NEF.

The first subscribe request may include a subscription request for the location. The location may be all of a path shown in FIG. 9 or a portion of the path shown in FIG. 9. To cover all regions (see FIG. 9a) or some regions (see FIG. 9b) for each path, the V2X application server may determine the location where the user plane congestion related analytics is requested. The path length denoted by the location can be selected to be appropriate for a specific application, and should be sufficient for safe operation within a specific time window (i.e., this path need not be an end-to-end path where the UE must arrive). If the first requested location occupies a partial region (e.g., Location #1) for each path, until the requested location covers the final destination, the V2X application server may request analytics information about the next location (e.g., Location #2) based on the path from the NWDAF, so that the NWDAF can report the requested analytics information at an appropriate time in consideration of the UE speed, a path, a V2X application, etc. Therefore, notification about the potential change of QoS can support application adjustment. The previously requested location may overlap with the next requested location.

If the location is a portion of the path, the V2X application server may perform subscription of the next location subsequent to the above location on the path, and may then cancel subscription of the above location.

Alternatively, the first subscribe request may include a subscription request for the plurality of locations. The subscription request for the plurality of locations may include a start time and an end time for each of the locations. That is, the V2X application server may include the plurality of locations, and may thus provide the subscription request. The plurality of locations may cover all or some of the path. Information for each location may include a start time and an end time of observation, an observation start time, and an observation valid time, that can be constructed in a list shape as described below.

{Location ID=1, Location Information (which can be expressed in various forms as described above), observation start time and observation end time}

{Location ID=2, Location Information (which can be expressed in various forms as described above), observation start time and observation end time}

{Location ID=3, Location Information (which can be expressed in various forms as described above), observation start time and observation end time}

In this case, the subscription requesting need not be performed several times, and subscription cancellation need not be performed. As described above, in response to the subscription request provided with the plurality of location information, the NWDAF may transmit a subscription request for each location to the OAM at the observation start time of each location. This operation may be performed by the NEF. Subsequently, the request update may be applied only to some locations. In this case, it is possible to provide the updated information for the ID of a target location to be updated.

Each of the plurality of locations may be a geographical region designated/described by the V2X application server. The geographical region may be any one of Cell ID(s), TAI(s), polygon, circle, and address.

Figure 10:
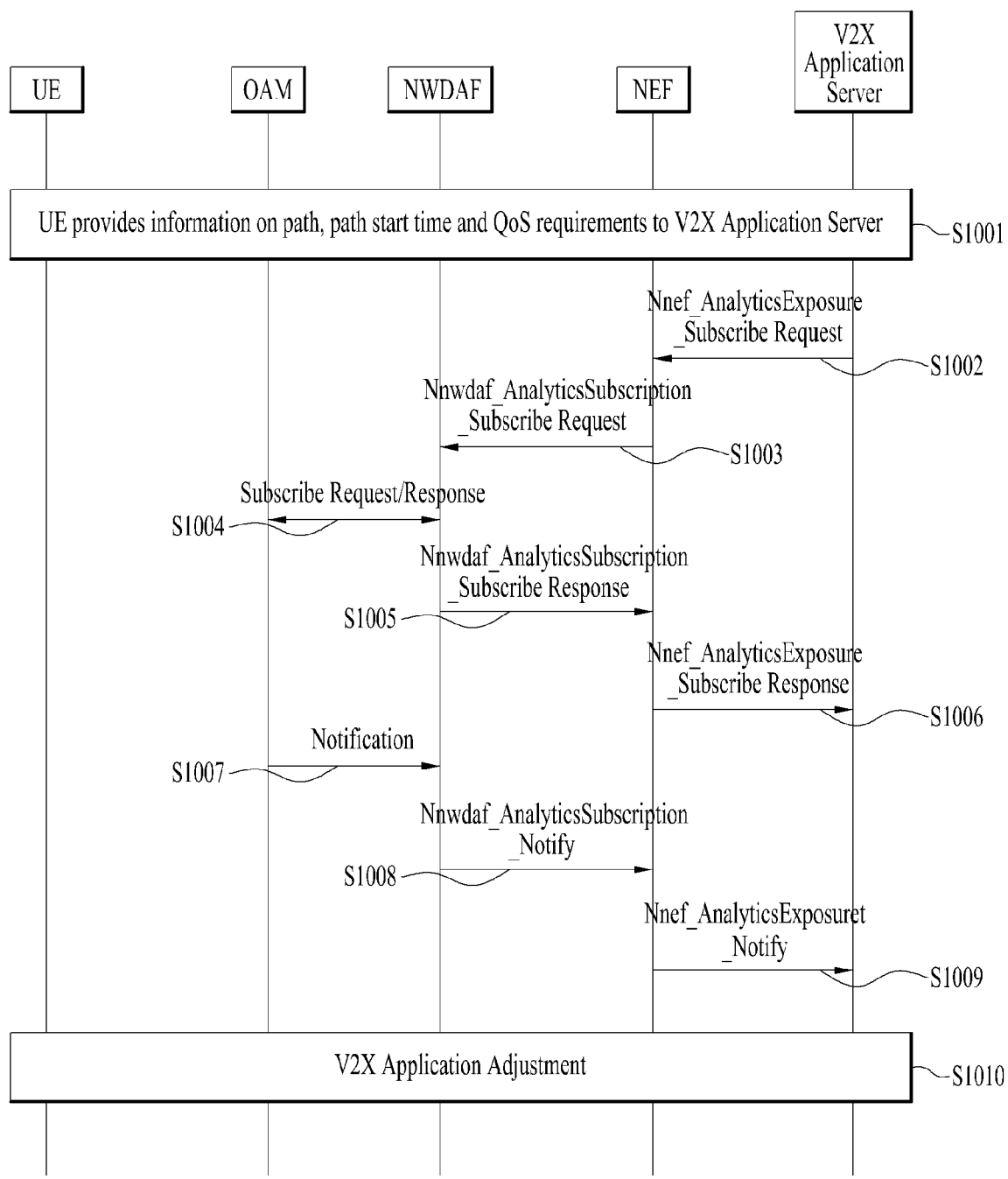

The operation for enabling the NWDAF to receive a notification message caused by the change of the user plane congestion status from the OAM and to transmit the user plane congestion notification to the V2X application server through the network exposure function (NEF) based on the notification message may correspond to steps S1007, S1008, and S1009 of FIG. 10. In addition, the method for enabling the NWDAF to receive a second subscribe request from the NEF that has received the first subscribe request related to the congestion related analytics information from the V2X application server, transmitting a third subscribe request to the OAM while providing a threshold value in response to the first subscribe request; receiving a response to the third subscribe request from the OAM, and transmitting the user plane congestion analytics derived from the response to the V2X application server through the NEF, as represented by S1003, S1004, S1005, and S1006 of FIG. 10. A detailed description thereof will be given.

In step S1001, the UE may provide the V2X application server with information about the path, the path start time, and QoS requirements (e.g., 5QI(s)).

Steps S1002 to S1009 are based on mechanisms and procedures that are specified in the section 6.11 describing 'Analytics Subscribe/Unsubscribe' and the section 6.12 describing 'User Plane Congestion Analytics' of TS 23.288.

In step S1002, the V2X application server may perform subscription of the analytics information from the NWDAF through the NEF. The analytics type may be set to the user plane congestion, and the object to be analyzed may be set to the location. The V2X application server may request statistics or prediction, or may request both of statistics and prediction. In the case of the analytics type, 'user plane congestion' may be used, or a new type may be defined and used as needed.

The above-described request may include location information. The requested location may be a geographical region designated/described by the V2X application server, and may be any one of Cell ID(s), TAI(s), other formats (e.g., polygon, circle, etc.), or civic address (e.g., streets, districts, etc.).

The requested location may cover the entire region for each path or the partial region for each path. If the first requested location includes a partial region (e.g., Location #1) for each path, until the requested location includes the final destination, the V2X application server may perform subscription of the NWDAF analytics information for the next location (e.g., Location #2) for each path, and may cancel subscription of the NWDAF analytics information for the previous location (e.g., Location #1). The previously requested location may overlap with the next requested location. The V2X application server may perform subscription of the NWDAF analytics information for the next location at an appropriate time in consideration of specific information (e.g., the UE speed, path, V2X application program, and the like).

The QoS requirements (e.g., 5QI(s), GFBR—UL & DL, MFBR—UL & DL) may be provided as threshold information to be used for the user plane congestion notification related to the QoS potential change.

Instead of providing the QoS requirements as threshold information, the QoS requirements and the threshold information can also be provided separately from each other (for example, in the QoS requirements, UD/DL GFBR (Guaranteed Flow Bit Rate)=XX Mbps, and UL/DL MFBR=YY Mbps, and in the threshold information, UL/DL GFBR=AA Mbps, and UL/DL MFBR=BB Mbps).

If several UEs simultaneously move to another place along the same path (i.e., the same departure and the same destination) and the same information is then received from the UEs (Step S1001), the V2X application server may perform the operation "subscription to analytics information to NWDAF" only once for these UEs. In this case, upon receiving the notification message related to the QoS potential change, the above UEs may be notified of this received information.

The above request may include the start time. If the analytics information subscription is approved by the NEF, the NEF may record the association between the analytics trigger and the requester ID.

In step S1003, the NEF may perform subscription of the analytics information from the NWDAF upon receiving a request from the V2X application server. When subscription is performed on the NWDAF analytics, the NEF may apply restriction (e.g., restriction of either a parameter or a parameter value received from 'Nnwdaf_AnalyticsSubscription_Subscribe' service operations) to the NWDAF in response to a subscription request for each operator configuration. If necessary, the NEF may construct location information provided by the V2X application server in the format (e.g., TA list, the list of cells, etc.) understood by the 3GPP system, and may provide the resultant location information.

In step S1004, in order to obtain the user plane congestion status for the requested location, the NWDAF may provide the congestion level thresholds, and may subscribe the received information to the OAM. The OAM may provide the first report for the requested information as a response.

In step S1005, NWDAF may derive the requested analytics, and may provide the NEF with the user plane congestion analytics.

In step S1006, NEF may provide the user plane congestion analytics to the V2X application server.

In step S1007, the change of the user plane congestion status exceeding the threshold decided by the NWDAF may be detected by the OAM, and the NWDAF may be notified thereof. Such notification may include the location and time where the potential change may occur. In this case, the change of the user plane congestion information detected by the OAM may refer to the following description of FIG. 11. The above-described notification may also include an item or reason indicating which QoS will be used for the potential change.

In step S1008, NWDAF may derive new analytics, and may provide notification of the user plane congestion analytics related to the NEF. The NWDAF may construct the notification information to be transferred to the V2X application server based on the notification information received from the OAM.

In step S1009, the NEF may provide the V2X application server with the notification of the user plane congestion analytics. If necessary, the NEF may enable the location information that is provided by the NWDAF in consideration of information about the location where the QoS potential change may occur, to be mapped to a format (for example, polygon, circle, or civic addresses (e.g., streets, districts, etc.)) capable of being understood by the V2X application server.

In step S1010, the V2X application adjustment may occur in the UE and/or in the V2X application server upon receiving the notification of the QoS potential change.

Whereas the above-described procedure is related to continuous reporting, it should be noted that the above-described procedure can also be reported only once. The V2X application server may directly interact with the NWDAF. For example, in the case where the V2X application server is a reliable application function (AF), the V2X application server can directly interact with the NWDAF.

Figure 11:
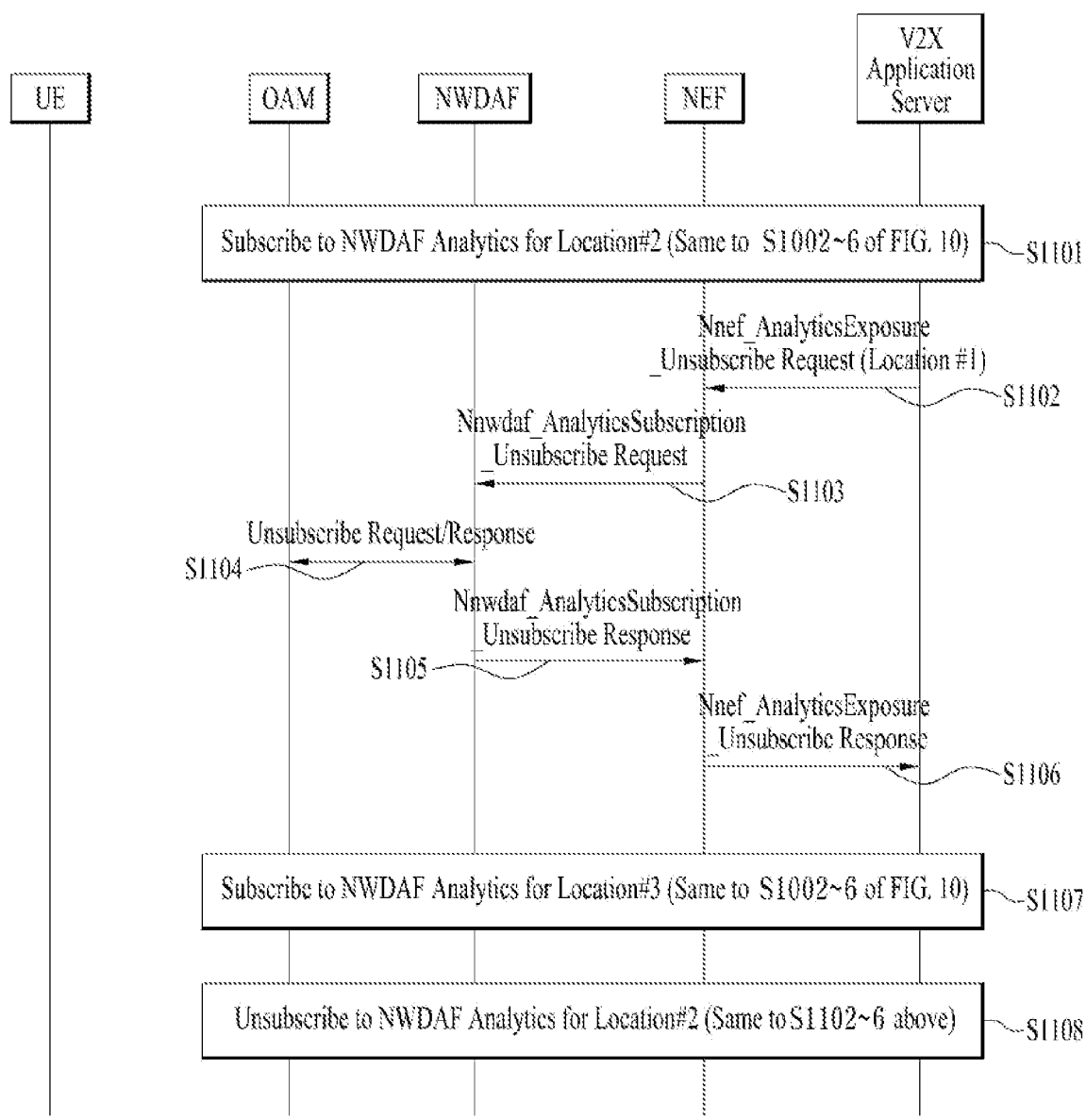

The V2X application server can perform subscription of the NWFAD analytics information for the next location for each path, and can cancel subscription of the NWDAF analytics information for the previous location, as shown in FIG. 11. A detailed description thereof will hereinafter be given with reference to FIG. 11. As shown in FIG. 11, when the path is changed and the updated path is provided from the UE, the V2X application server may perform subscription of the NWDAF analytics information for the location that is updated along the path, and may perform unsubscription of the NWDAF analytics information for the previously requested location.

In step S1101, the V2X application server may perform subscription of the user plane congestion analytics for the NWDAF at the next location (e.g., Location #2) for each path through the NEF. This step S1101 may correspond to steps S1002 to S1006 shown in FIG. 10.

In steps S1102 to S1103, the V2X application server may perform unsubscription of the user plane congestion analytics for the NWDAF at the previous location (e.g., Location #1) through the NEF.

In step S1104, NWDAF may perform unsubcription of the user plane congestion for the OAM at the previous location (e.g., Location #1).

In steps S1105 to S1106, the V2X application server may receive a response.

In steps S1107 to S1108, until the requested location includes the final destination, subscription of the user plane congestion analytics for the next location for each path and unsubscription of the user plane congestion analytics for the previous location may be repeatedly carried out.

When subscription to continuous reporting is performed, a subscription period (e.g., observation period, duration, valid period, etc.) is provided, so that the V2X application server may not separately perform unsubscription.

If the QoS requirements and/or the threshold values (i.e., threshold information) are changed (for example, due to input data received from the UE as well as decision to change the V2X application server), the V2X application server may perform "Subscription to NWDAF analytic information" using the changed information and may perform unsubscription in advance using the changed information.

For the new/changed location, the new/changed QoS requirements, and/or threshold information (that can be interpreted by the analytic filter), new subscription can be performed. Instead of cancelling the previous subscription, the V2X application server may also update the conventional subscription using the changed parameters. To this end, identification (ID) information (e.g., analytic ID) that can refer to or can identify the conventional subscription can be provided to the subscription update request.

In step S1002 of FIG. 10, the V2X application server may request subscription using the plurality of locations. The plurality of locations may cover the entirety of the path, or may cover only a portion of the path. Each location may include the start time and the end time of observation, or may include the observation start time and the observation valid time. For example, the above-described information may be constructed in a list format, and may be included as described below.

{Location ID=1, Location Information (which can be expressed in various forms as described above), observation start time and observation end time}

{Location ID=2, Location Information (which can be expressed in various forms as described above), observation start time and observation end time}

{Location ID=3, Location Information (which can be expressed in various forms as described above), observation start time and observation end time}

As described above, the subscription request need not be performed several times, and subscription cancellation need not be performed. As described above, in response to the subscription request provided with the plurality of location information, the NWDAF may transmit a subscription request for each location to the OAM at the observation start time of each location. This operation may be performed by the NEF. Subsequently, the request update may be applied only to some locations. In this case, it may be possible to provide the updated information for the ID of a target location to be updated.

Figure 12:
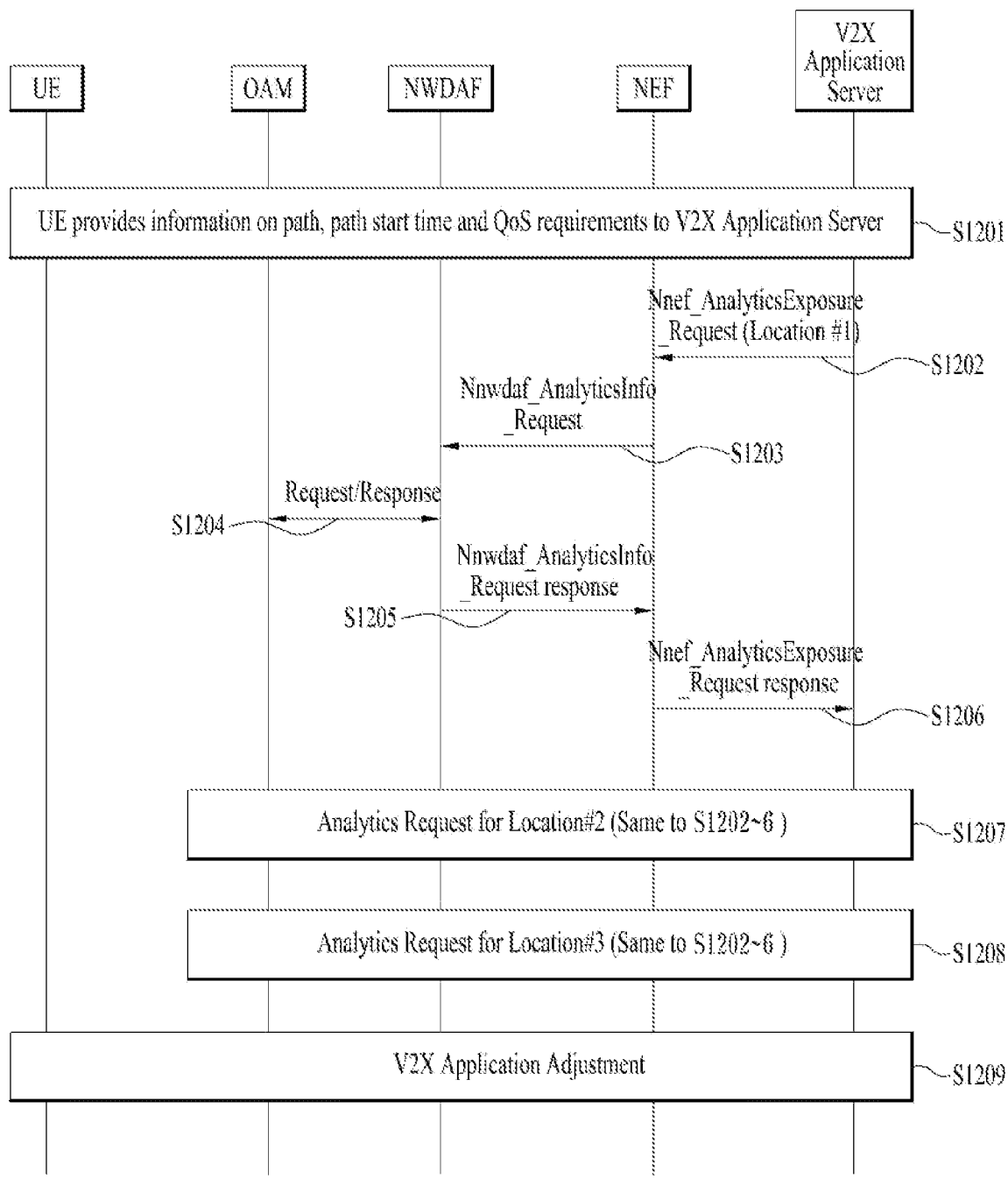

FIG. 12 is a flowchart illustrating the interaction between the V2X application server and the NWDAF that are performed through the NEF. The V2X application server may directly interact with the NWDAF (e.g., if the V2X application server is a reliable AF).

In step S1201, the UE may provide the V2X application server with information about the path, the path start time, and QoS requirements (e.g., 5QI).

Steps S1202 to S1206 are based on mechanisms and procedures that are defined in section 6.1.2 describing 'Analytics Request' and section 6.12 describing 'User Plane Congestion Analytics' of TS 23.288.

In step S1202, the V2X application server may request reception of analytics information from the NWDAF through the NEF. Information included in the request by the V2X application server may refer to step S1002 of FIG. 10. If the NEF approves the analytics information request, the NEF may record the association between the analytics trigger and the requester ID.

In step S1203, NEF may transmit 'Nnwdaf_AnalyticsInfo_Request' to the NWDAF upon receiving a request from the V2X application server. This situation may refer to step S1003 of FIG. 10.

In step S1204, if the request is approved, the NWDAF may request the user plane congestion status of the requested location from the OAM so that the NWDAF can provide the requested analytics. The OAM can also provide the requested information. If information about the user plane congestion status for the requested location is present in the NWDAF, the step S1204 can be omitted.

In step S1205, NWDAF may derive the requested analytics, and may provide the NEF with the user plane congestion analytics. This situation may refer to step S1008 of FIG. 10.

In step S1206, NWDAF may provide the V2X application server with the user plane congestion analytics. This situation may refer to step S1009 of FIG. 10.

In steps S1207 and S1208, if the location that is requested by the V2X application server in step S1202 covers only some parts of the path, the V2X application server should persistently request the analytics information for the next location. This continuous requesting operation should be performed at an appropriate time in consideration of the UE speed, the path, the V2X application, etc. As a result, information about the QoS potential change received by the V2X application server may assist the application adjustment. This analytic information request may be performed until the requested location covers the final destination.

In step S1209, the V2X application adjustment may occur in the UE and/or in the V2X application server upon receiving the notification of the QoS potential change.

In step S1202, the V2X application server may generate a request for the plurality of locations. The plurality of locations may cover the entirety of the path, or may cover only a portion of the path. Each location may include the start time and the end time of observation, or may include the observation start time and the observation valid time. For example, the above-described information may be constructed in a list format, and may be included as described below.

{Location ID=1, Location Information (which can be expressed in various forms as described above), observation start time}
{Location ID=2, Location Information (which can be expressed in various forms as described above), observation start time}
{Location ID=3, Location Information (which can be expressed in various forms as described above), observation start time}

As a result, such requesting need not be performed several times. As described above, in response to the request provided with the plurality of location information, the NWDAF may transmit a subscription request for each location to the OAM at the observation start time of each location. This operation may be performed by the NEF. Subsequently, the request update may be applied only to some locations. In this case, it may be possible to provide the updated information for the ID of a target location to be updated.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
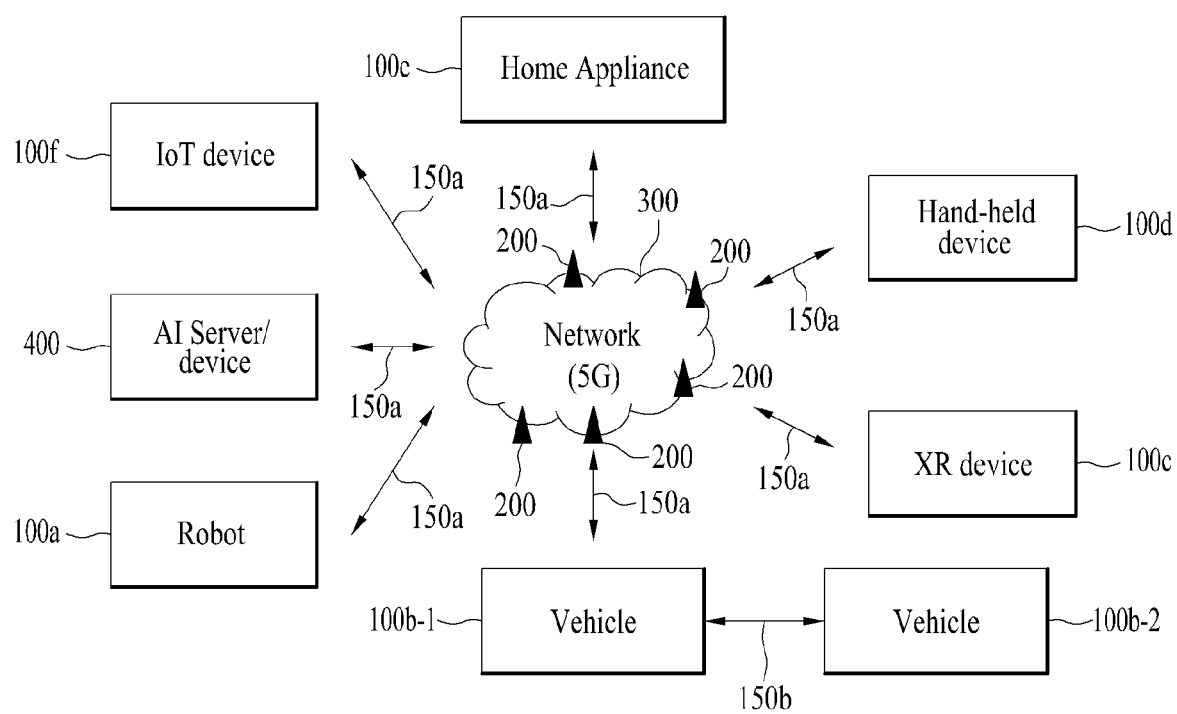
FIG. 13 illustrates a communication system applied to the present disclosure.

FIG. 13 illustrates a communication system 1 applied to the present disclosure.

Referring to FIG. 13, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of things (IoT) device 100*f*, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. V2V/V2X communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as UL/DL communication 150*a*, sidelink communication 150*b* (or, D2D communication), or inter BS communication (e.g. relay, integrated access backhaul (IAB)). The wireless devices and the BSs/ the wireless devices may transmit/receive radio signals to/from each other through the wireless communication/ connections 150*a* and 150*b*. For example, the wireless communication/connections 150*a* and 150*b* may transmit/ receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 14:
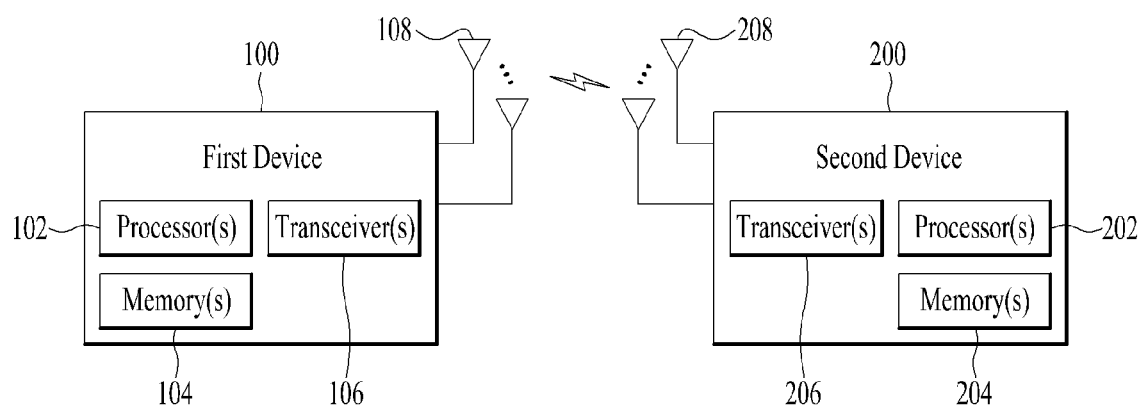
FIG. 14 shows an example of wireless devices applicable to the present disclosure.

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions.

Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Signal Process Circuit Applicable to the Present Disclosure

Figure 15:
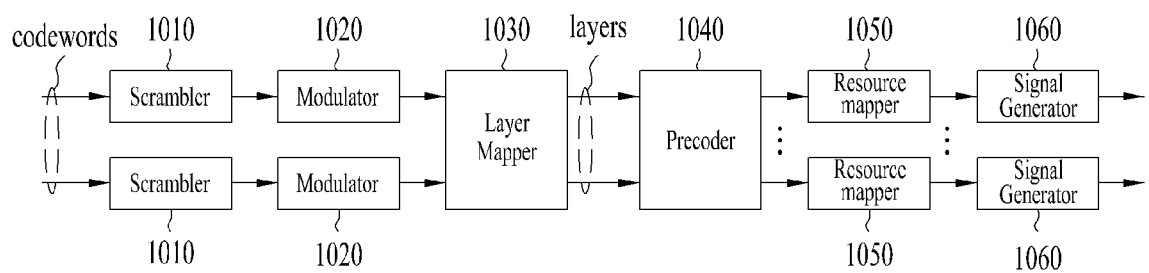
FIG. 15 illustrates a signal processing circuit for transmission signal.

FIG. 15 illustrates a signal process circuit for a transmission signal.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include IFFT modules, CP inserters, digital-to-analog converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency DL converters, analog-to-digital converters (ADCs), CP remover, and FFT modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of Application of Wireless Device Applicable to the Present Disclosure

Figure 16:
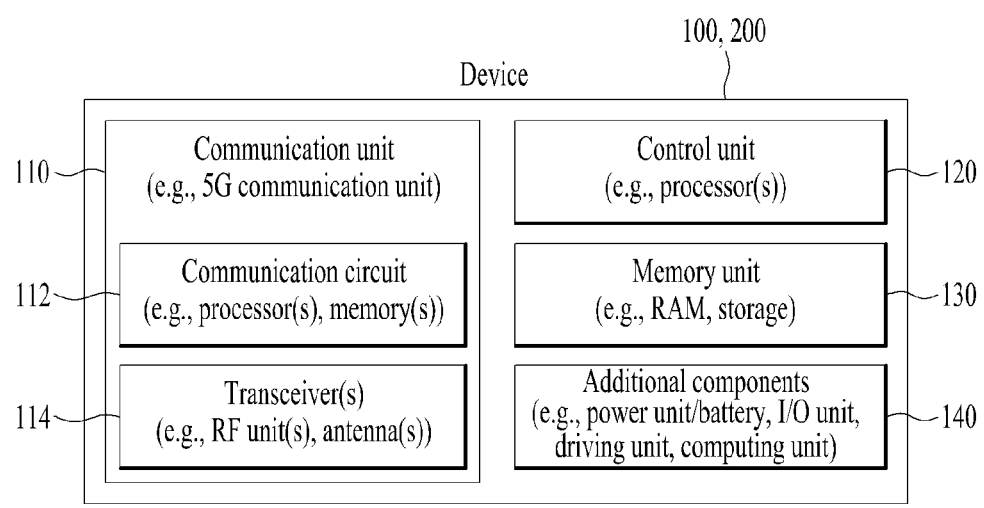
FIG. 16 shows another example of wireless devices applied to the present disclosure.

FIG. 16 illustrates another example of a wireless device applied to the present disclosure. The wireless device may be implemented in various forms according to a use-case/service (refer to FIG. 13).

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a FinTech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Hereinafter, an example of implementing FIG. 16 will be described in detail with reference to the drawings.

Examples of a Hand-Held Device Applicable to the Present Disclosure

Figure 17:
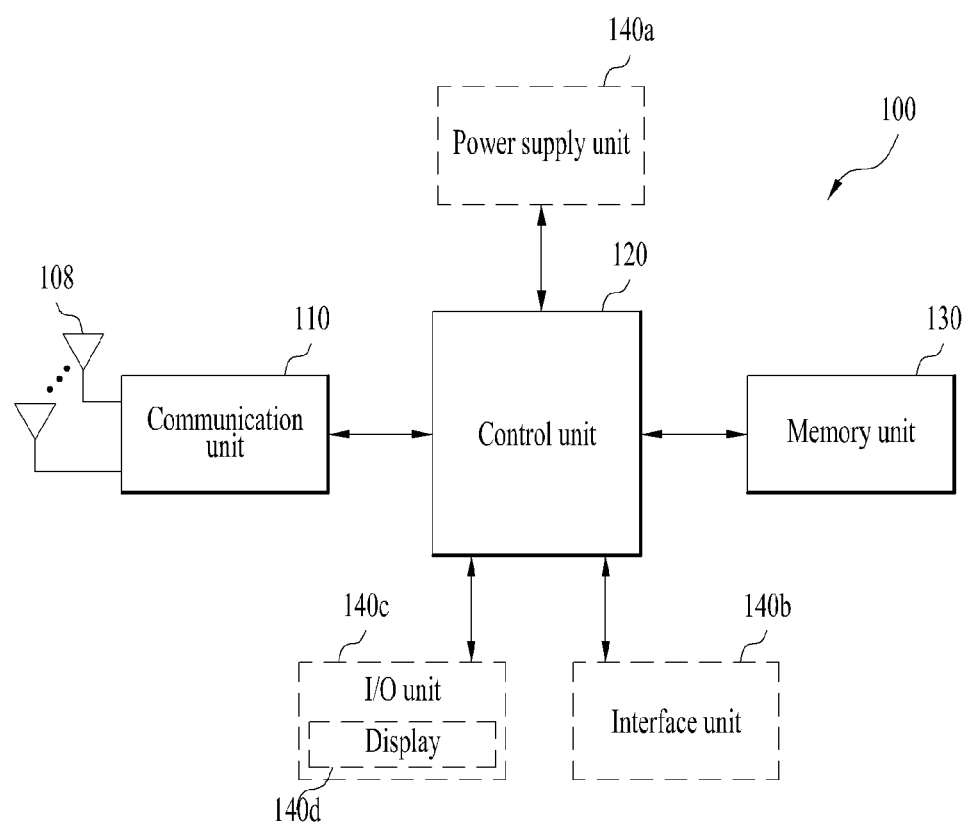
FIG. 17 illustrates a portable device to which the present disclosure is applied.

FIG. 17 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 18:
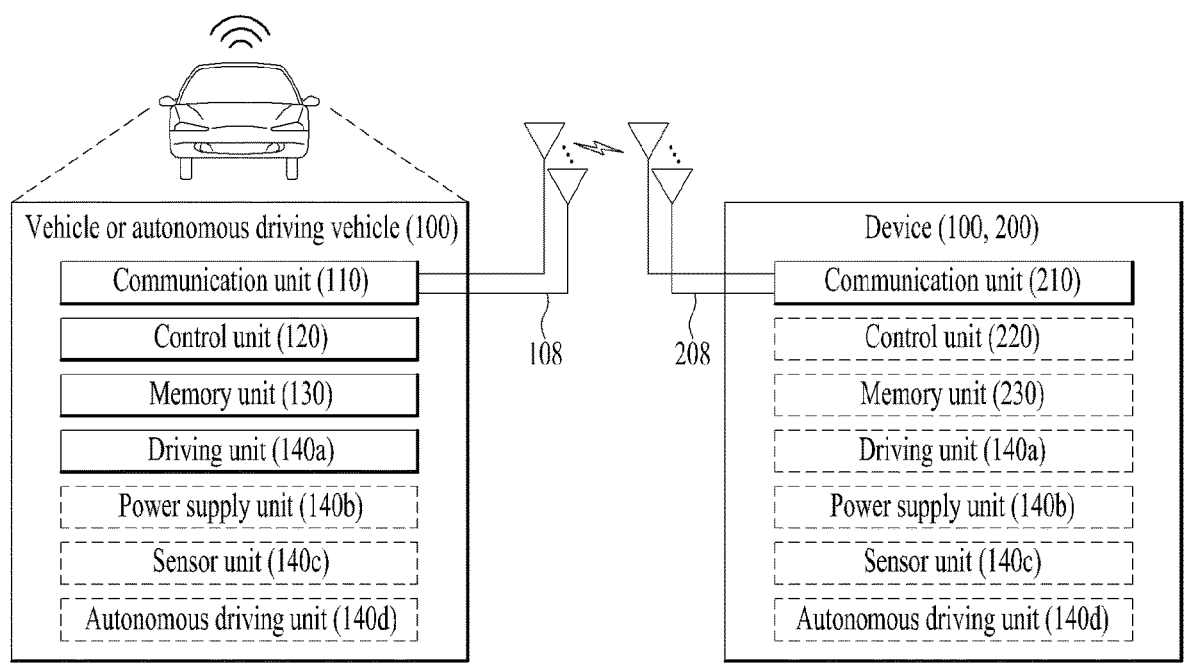
FIG. 18 illustrates a vehicle or autonomous driving vehicle to which the present disclosure is applied.

Examples of a Vehicle or an Autonomous Driving Vehicle Applicable to the Present Disclosure FIG. 18 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 18, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is configured, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

Figure 19:
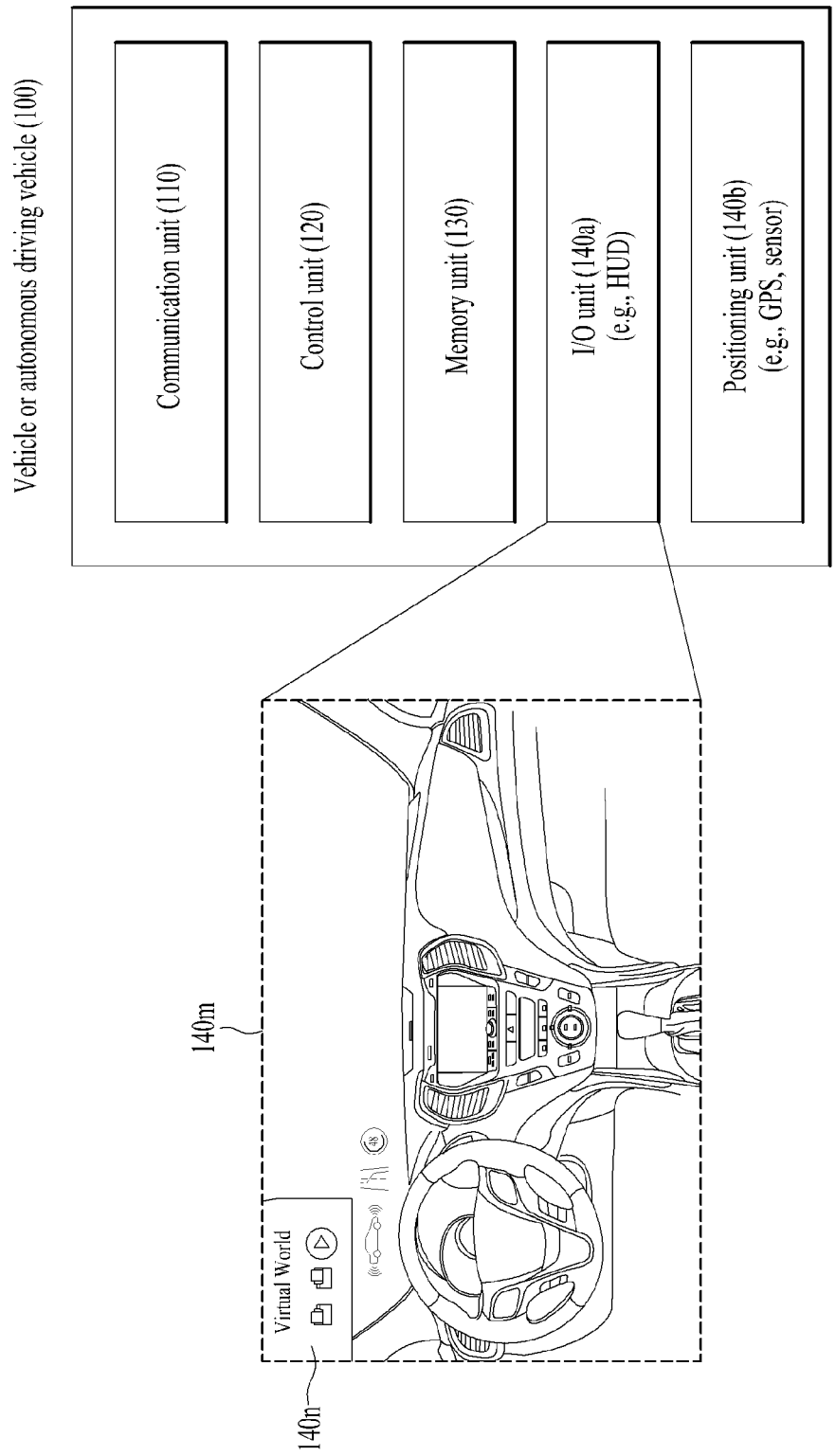
FIG. 19 illustrates a vehicle to which the present disclosure is applied.

FIG. 19 illustrates a vehicle applied to the present disclosure. The vehicle may be implemented as a transport means, an aerial vehicle, a ship, etc.

Referring to FIG. 19, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 16.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 20:
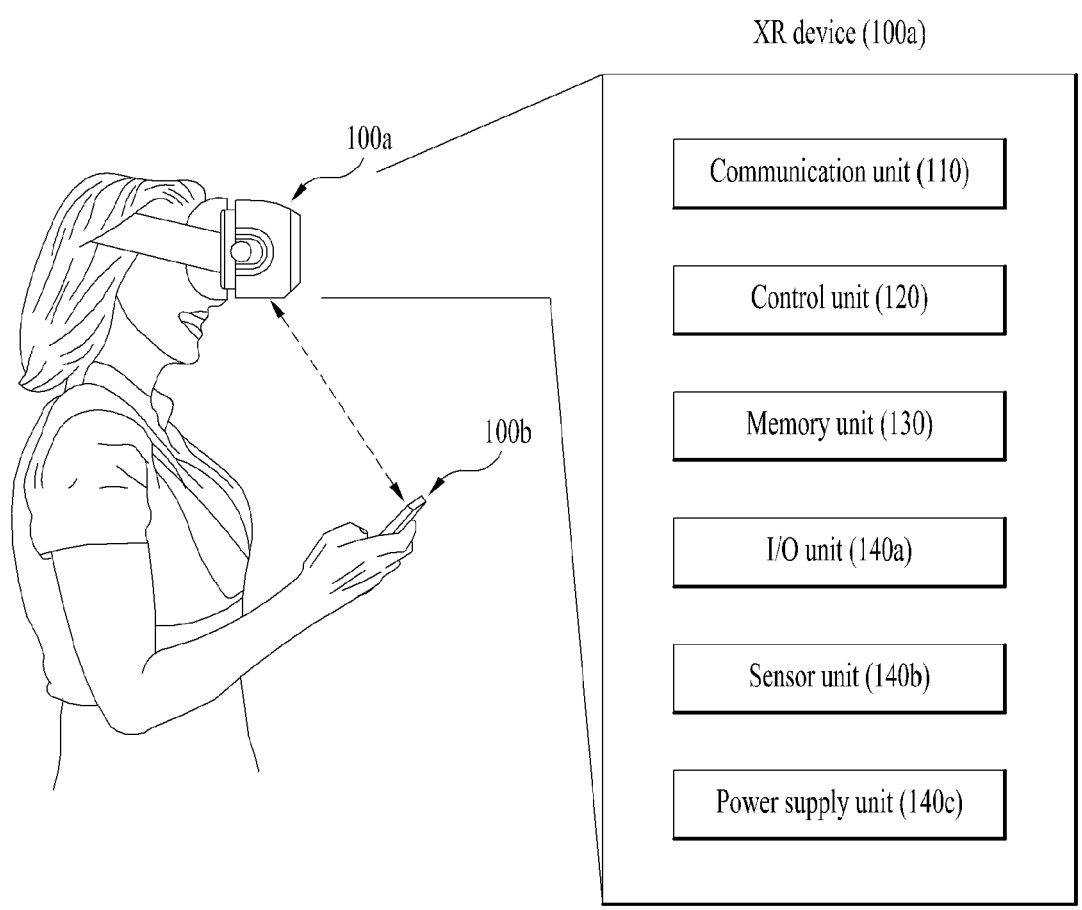
FIG. 20 illustrates an XR device to which the present disclosure is applied.

FIG. 20 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 20, an XR device 100a may include a communication unit 110, a control unit 120, a memory unit 130, an I/O unit 140a, a sensor unit 140b, and a power supply unit 140c. Herein, the blocks 110 to 130/140a to 140c correspond to the blocks 110 to 130/140 of FIG. 16, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

Figure 21:
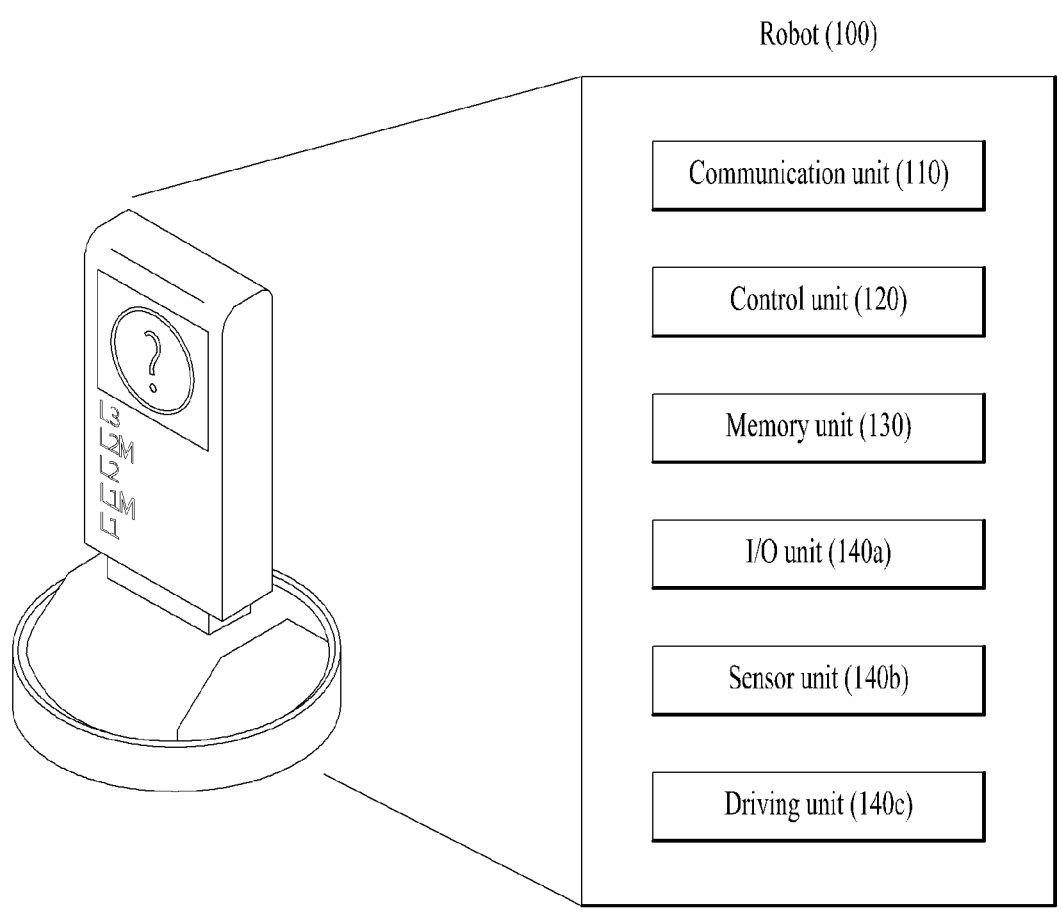
FIG. 21 illustrates a robot to which the present disclosure is applied.

FIG. 21 illustrates a robot applied to the present disclosure. The robot may be categorized into an industrial robot, a medical robot, a household robot, a military robot, etc., according to a used purpose or field.

Referring to FIG. 21, a robot 100 may include a communication unit 110, a control unit 120, a memory unit 130, an I/O unit 140*a*, a sensor unit 140*b*, and a driving unit 140*c*. Herein, the blocks 110 to 130/140*a* to 140*c* correspond to the blocks 110 to 130/140 of FIG. 16, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140*a* may obtain information from the exterior of the robot 100 and output information to the exterior of the robot 100. The I/O unit 140*a* may include a camera, a microphone, a user input unit, a display unit, a speaker, and/or a haptic module. The sensor unit 140*b* may obtain internal information of the robot 100, surrounding environment information, user information, etc. The sensor unit 140*b* may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140*c* may perform various physical operations such as movement of robot joints. In addition, the driving unit 140*c* may cause the robot 100 to travel on the road or to fly. The driving unit 140*c* may include an actuator, a motor, a wheel, a brake, a propeller, etc.

Examples of an AI Device Applicable to the Present Disclosure

Figure 22:
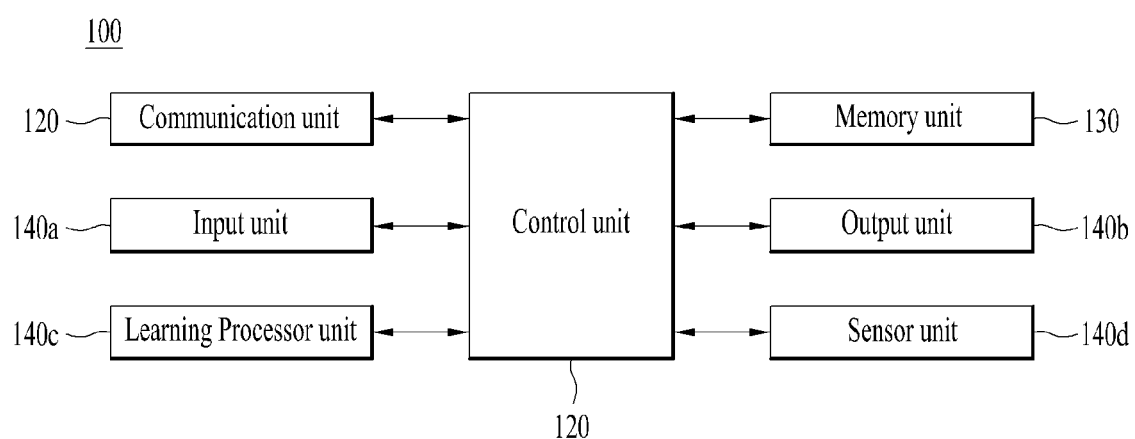
FIG. 22 illustrates an AI device to which the present disclosure is applied.

FIG. 22 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 22, an AI device 100 may include a communication unit 110, a control unit 120, a memory unit 130, an I/O unit 140*a*/140*b*, a learning processor unit 140*c*, and a sensor unit 140*d*. The blocks 110 to 130/140*a* to 140*d* correspond to blocks 110 to 130/140 of FIG. 16, respectively.

The communication unit 110 may transmit and receive wired/radio signals (e.g., sensor information, user input, learning models, or control signals) to and from external devices such as other AI devices (e.g., 100*x*, 200, or 400 of FIG. 13) or an AI server (e.g., 400 of FIG. 13) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analytics algorithm or a machine learning algorithm. The control unit 120 may perform an operation determined by controlling constituent elements of the AI device 100. For example, the control unit 120 may request, search, receive, or use data of the learning processor unit 140*c* or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140*c* or transmit the collected information to an external device such as an AI server (400 of FIG. 13). The collected history information may be used to update a learning model.

The memory unit 130 may store data for supporting various functions of the AI device 100. For example, the memory unit 130 may store data obtained from the input unit 140*a*, data obtained from the communication unit 110, output data of the learning processor unit 140*c*, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 13). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL APPLICABILITY

The above-described embodiments of the present disclosure are applicable to various mobile communication systems.

The invention claimed is:

1. A method for enabling a network data analytics function (NWDAF) to transmit and receive signals in a wireless communication system comprising:
   receiving, by the NWDAF, a notification message based on a change of a user plane congestion status from operations and maintenance (OAM); and
   transmitting, by the NWDAF, a user plane congestion analytics notification based on the notification message to a V2X application server through a network exposure function (NEF),
   wherein the change of the user plane congestion status is determined based on at least one information including specific information indicating whether a QoS Notification Control (QNC) notification has been transmitted; and
   wherein the specific information indicating whether the QNC notification has been transmitted is determined based on a counter value that increases when an NG-RAN transmits 'GFBR cannot be fulfilled/guaranteed' to a session management function (SMF) and decreases when the NG-RAN transmits 'GFBR cannot be fulfilled/guaranteed' to the SMF.

2. The method according to claim 1, wherein:
the notification of the user plane congestion analytics includes information about a location and time where a QoS (quality of service) potential change occurs.

3. The method according to claim 1, further comprising:
receiving, by the NWDAF, a second subscribe request from the NEF that has received a first subscribe request related to congestion related analytics information from the V2X application server;
transmitting, by the NWDAF, a third subscribe request to the OAM while providing a threshold value in response to the first subscribe request;
receiving, by the NWDAF, a response to the third subscribe request from the OAM; and
transmitting, by the NWDAF, the user plane congestion analytics calculated based on the response to the V2X application server through the NEF.

4. The method according to claim 3, wherein:
the first subscribe request includes a subscription request for a plurality of locations.

5. The method according to claim 4, wherein:
the subscription request for the plurality of locations includes an observation start time and an observation end time for each of the locations.

6. The method according to claim 4, wherein:
each of the plurality of locations is a geographical region designated/described by the V2X application server.

7. The method according to claim 6, wherein:
the geographical region is any one selected from among cell ID(s), TAI(s), a polygon, a circle, and an address.

8. The method according to claim 3, wherein:
the first subscribe request includes a subscription request for a location.

9. The method according to claim 8, wherein:
if the location is a portion of a path, the V2X application server performs subscription for a next location subsequent to the location on the path, and then cancels subscription of the location.

10. The method according to claim 3, wherein:
the threshold value is included in the at least one information.

11. The method according to claim 3, wherein:
the threshold value is at least one of 5QI(s), GFBR—UL & DL, and MFBR—UL & DL.

12. The method according to claim 3, wherein:
the NEF converts a location where there is a possibility that the QoS potential change occurs, into any one of a polygon, a circle, and an address.

13. A device for use in a wireless communication system comprising:
   at least one processor; and
   at least one computer memory operatively connected to the at least one processor, and configured to store instructions such that the at least one processor performs specific operations by executing the instructions,
   wherein the specific operations include:
      receiving, by the NWDAF, a notification message based on a change of a user plane congestion status from operations and maintenance (OAM); and transmitting, by the NWDAF, a user plane congestion analytics notification based on the notification message to a V2X application server through a network exposure function (NEF),
   wherein the change of the user plane congestion status is determined based on at least one information including specific information indicating whether a QoS Notification Control (QNC) notification has been transmitted; and
      wherein the specific information indicating whether the QNC notification has been transmitted is determined based on a counter value that increases when an NG-RAN transmits 'GFBR cannot be fulfilled/guaranteed' to a session management function (SMF) and decreases when the NG-RAN transmits 'GFBR cannot be fulfilled/guaranteed' to the SMF.

\* \* \* \* \*